United States Patent [19]

Klingler et al.

[11] Patent Number: 4,630,928
[45] Date of Patent: Dec. 23, 1986

[54] LENGTH MEASURING DEVICE

[75] Inventors: Otto Klingler, Oberndorf-Boll; Siegfried Gruhler, Vöhringen, both of Fed. Rep. of Germany

[73] Assignee: Mäuser-Werke Oberndorf GmbH, Fed. Rep. of Germany

[21] Appl. No.: 714,695

[22] Filed: Mar. 21, 1985

[30] Foreign Application Priority Data

Apr. 4, 1984 [DE] Fed. Rep. of Germany ....... 3412557

[51] Int. Cl.$^4$ ................................................ G01B 7/02
[52] U.S. Cl. ................................ 356/374; 250/237 G; 340/347 P
[58] Field of Search .............................. 356/374, 383; 250/237 G; 33/125 A, 125 C; 340/347 P; 377/3

[56] References Cited

U.S. PATENT DOCUMENTS 4,225,931  9/1980  Schwefel ................................ 377/3
4,306,220 12/1981  Schwefel ........................ 250/237 G
4,547,667 10/1985  Sasaki et al. .................. 250/231 SE Primary Examiner—R. A. Rosenberger
Attorney, Agent, or Firm—McGlew and Tuttle

[57] ABSTRACT

In a length measuring device with a measuring transducer system, the curve of two sinusoidal test signals is dependent on the longitudinal movement of the measuring transducer system. An interpolation circuit delivers two high-resolution rectangular pulse sequences F1, F2 corresponding to the interpolated sinusoidal voltages and offset by 90°, to an evaluating circuit. To achieve a high-resolution at low speeds of travel and a low-resolution at high speeds, two rectangular pulse sequences S1, S2 or G1, G2, offset by 90° and giving a low-resolution, are additionally derived at the interpolation circuit. A control logic circuit 19 monitors the test voltages for attainment of a certain value of the longitudinal movement per unit time or speed of travel. The control logic circuit lets only the low-resolution rectangular pulse sequences through to the evaluating circuit when this value is exceeded, while it lets the high-resolution rectangular pulse sequences with the low-resolution rectangular pulse sequences when this value is not reached.

4 Claims, 2 Drawing Figures

LENGTH MEASURING DEVICE

FIELD AND BACKGROUND OF THE INVENTION

The present invention relates in general to electronic micrometers and, in particular, to a new and useful length measuring system which sends, as a test signal, two offset sinusoidal voltages whose curve depends on the longitudinal movement of the measuring system, to an interpolation circuit which sends to an evaluating circuit two high resolution rectangular pulse sequences corresponding to the interpolation sinusoidal voltages and which are offset by 90°.

Length measuring devices whose resolution is to be higher than the distance between marks on the scale of a measuring system, must operate with a correspondingly high interpolation factor. A high interpolation factor, however, presupposes that the two test signals are phase-locked relatively to each other and have constant amplitudes and D.C. voltage components.

On the other hand, length measuring devices should be brought to their test position at a high speed of travel. Due to the occurring accelerations, tilting or other interferences are then inevitable. As a result, the mentioned conditions for a high interpolation factor are not fulfilled. The length measuring device will then miscount.

SUMMARY OF THE INVENTION

It is the object of the present invention to provide a length measuring device of the initially mentioned kind which permits measuring with high-resolution at low speed of travel and with low-resolution at high speed of travel.

According to the invention, the above problem is solved in a length measuring device in that at an interpolation circuit, additionally two rectangular pulse sequences offset by 90° and giving a low-resulution are derived, a monitoring circuit monitors the test voltages for attainment of a certain value of the longitudinal movement per unit time (speed of travel), and a control logic circuit lets only the low-resolution rectangular pulse sequence get to the evaluating circuit when this value is exceeded, while it lets the high-resolution rectangular pulse sequences get there when this value has not been reached. The control logic circuit synchronizes the high-resolution rectangular pulse sequences with the low-resolution rectangular pulse sequences when this value is not reached.

In case of rapid movements of the measuring system, only the low-resolution rectangular pulses are evaluated. The problem wherein the measuring system loses its references, i.e. miscounts, is thus avoided. Tilting or other disturbances of the measuring system have no adverse effect despite the high speed of travel. The measuring system can be moved into a measuring position at high speed. Because of the high speed of travel, the possible measurement range is great. At low speed of travel the high-resolution rectangular pulses are evaluated. This results in a high accuracy of measurement. The switching from evaluation of the low-resolution pulses to evaluation of the high-resolution pulses and vice versa is automatic. Thereby also accelerations or movements of the measuring system are suppressed in their effect on the evaluation, on which the operator of the length measuring device has no influence.

Accordingly, a further object of the invention is to provide a length measuring device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
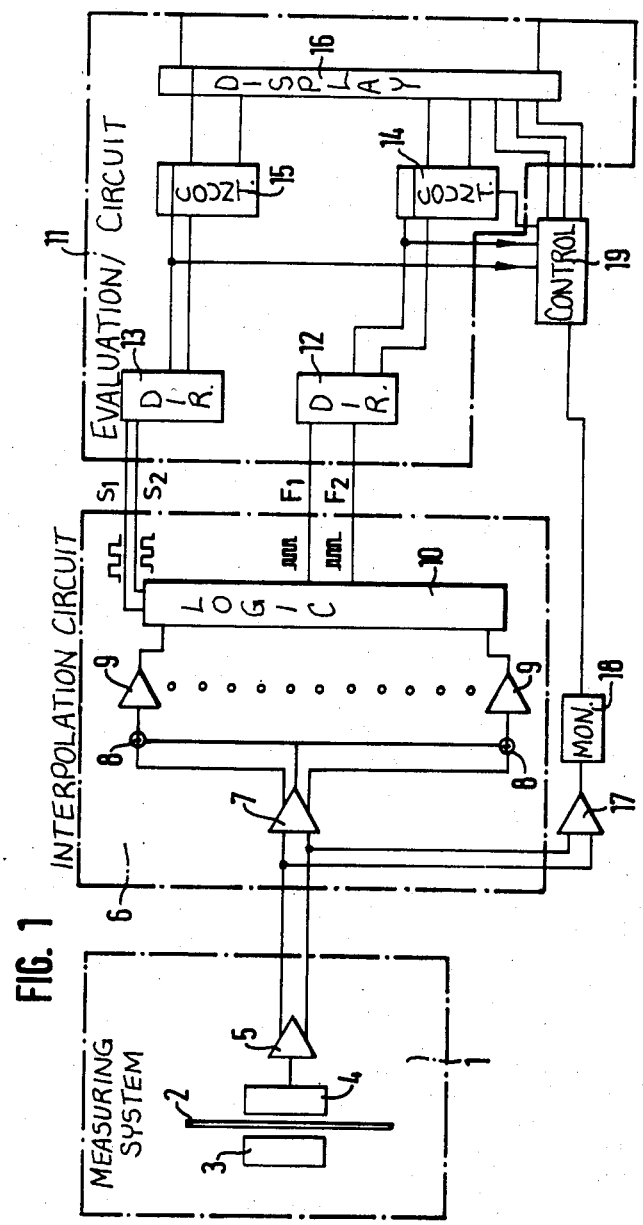
FIG. 1 is a block diagram which shows a first embodiment of the invention.

Referring to the drawings in particular the invention embodied therein comprises a device for measuring a length which utilizes a measuring system or measuring transducer which generates two offset sinusoidal voltage signals which depend on a movement whose length is to be measured. An interpolation circuit is connected to the measuring system for processing the voltage signals to form both a pair of low-resolution rectangular pulse sequences which are offset by 90° with respect to each other, and a pair of high-resolution rectangular pulse sequences which are offset by 90° with respect to each other. An evaluation circuit is connected to the interpolation circuit for providing a measurement of the movement length based either on the low-resolution sequence alone or on both the low and high-resolution sequences. A monitor circuit is connected to the measuring system for measuring the speed of movement. A control logic circuit is connected to the monitor circuit and is also connected to the evaluation circuit so as to generate a length measurement signal which is based only on the low-resolution sequence when the speed of movement has been determined by the monitor circuit to be too high, and both on the low and high-resolution sequences when the speed of movement is low enough so that the interpolated low-resolution sequences are also valid.

An incremental measuring system 1 comprises a glass scale 2 with an incremental graduation as standard. The glass scale 2 lies between an opto-electronic transmitter 3 and a corresponding receiver 4. Receiver 4 has a scanning grid (not shown). Connected after the receiver 4 is a preamplifier and converter 5 which converts the optical signals received during displacement of the transmitter 3 and the receiver 4 as a unit, along scale 2, into two sinusoidal voltages offset to each other by 90°.

The two sinusoidal voltages are supplied to an interpolation circuit 6. The latter comprises an input amplifier 7, which is connected to a logic circuit 10 via summation points 8 and comparators 9. The interpolation circuit 6 interpolates the sinusoidal voltages and transforms them into two rectangular pulse sequences F1 and F2. The rectangular pulses are offset to each other by 90°. These are the high-resolution rectangular pulses.

At the interpolation circuit 6, low resolution rectangular pulses S1 and S2 are taken off, which also are offset to each other by 90°. The high-resolution rectangular pulse sequences F1 and F2 correspond to a resolution of, for example, 0.125 μm for a selected measurement range of 10 mm. The low-resolution rectangular pulse sequences S1 and S2 correspond to a resolution of for example 5 μm.

The pulse sequence F1,F2 and S1,S2 are supplied to an evaluating circuit 11. For the pulse sequences F1 and F2 and for the pulse sequences S1 and S2 this circuit comprises a direction discriminator 12 and 13, respectively. Each direction discriminator 12, 13 is followed by a forward/backward counter 14,15. The counters 14 and 15 are connected to a display unit 16.

The two sinusoidal voltages are applied to a differential amplifier 17, to which is connected a monitoring circuit 18 which continuously monitors the signal quality of the two sinusoidal signals. If the rate of pulses is too great or their quality too low, a control signal is generated. The monitoring circuit 18 is coupled to a control logic circuit 19. The clock outputs of the two direction detectors or discriminators 12 and 13 are connected to 19. The control logic circuit 19 is connected to the reset input of the counter 14 of the high-resolution rectangular pulse sequence F1, F2. In addition, the control logic circuit 19 is connected to the display unit 16. The clock pulse generated by the direction discriminators 12 and 13 is evaluated by counter 14. The control logic needs both clock pulses for monitoring and synchronization.

The mode of operation of the described device is as follows: If a measuring slide (not shown), on which the transmitter 3 and the receiver 4 are arranged, is moved at a high speed of travel, e.g. a speed between 0.13 m/s and 2 m/s (m/s=meters per second), the monitoring circuit 18 sends its control signal to the control logic circuit 19, whereby the latter blocks the counter 14 or sets it to zero which every low resolution rectangular pulse. Only the count of the low-resolution rectangular pulses gets to the display unit 16. These rectangular pulses are rated so that they have for example a resolution of 5 μm.

If the speed of travel falls short of the value of 0.13 m/s, for example, then also the count of the high-resolution rectangular pulses F1 and F2 gets to the display unit 16. The control logic circuit 19 synchronizes the counter 14 as a function of the low-resolution rectangular pulses S1 and S2. The respective circuit state of the control logic circuit 19 is indicated at the display unit 16. Thus, after each low-resolution pulse S1 or S2, counter 14 is reset to zero. The reading at 16 is thus given as the number of low-resolution pulses plus the number of high-resolution pulses after the last low-resolution pulse. In addition, during evaluation of the high-resolution rectangular pulses the counter 14 can be monitored for synchronization with counter 15. A "falling out of step" is indicated by the control logic circuit 19.

Figure 2:
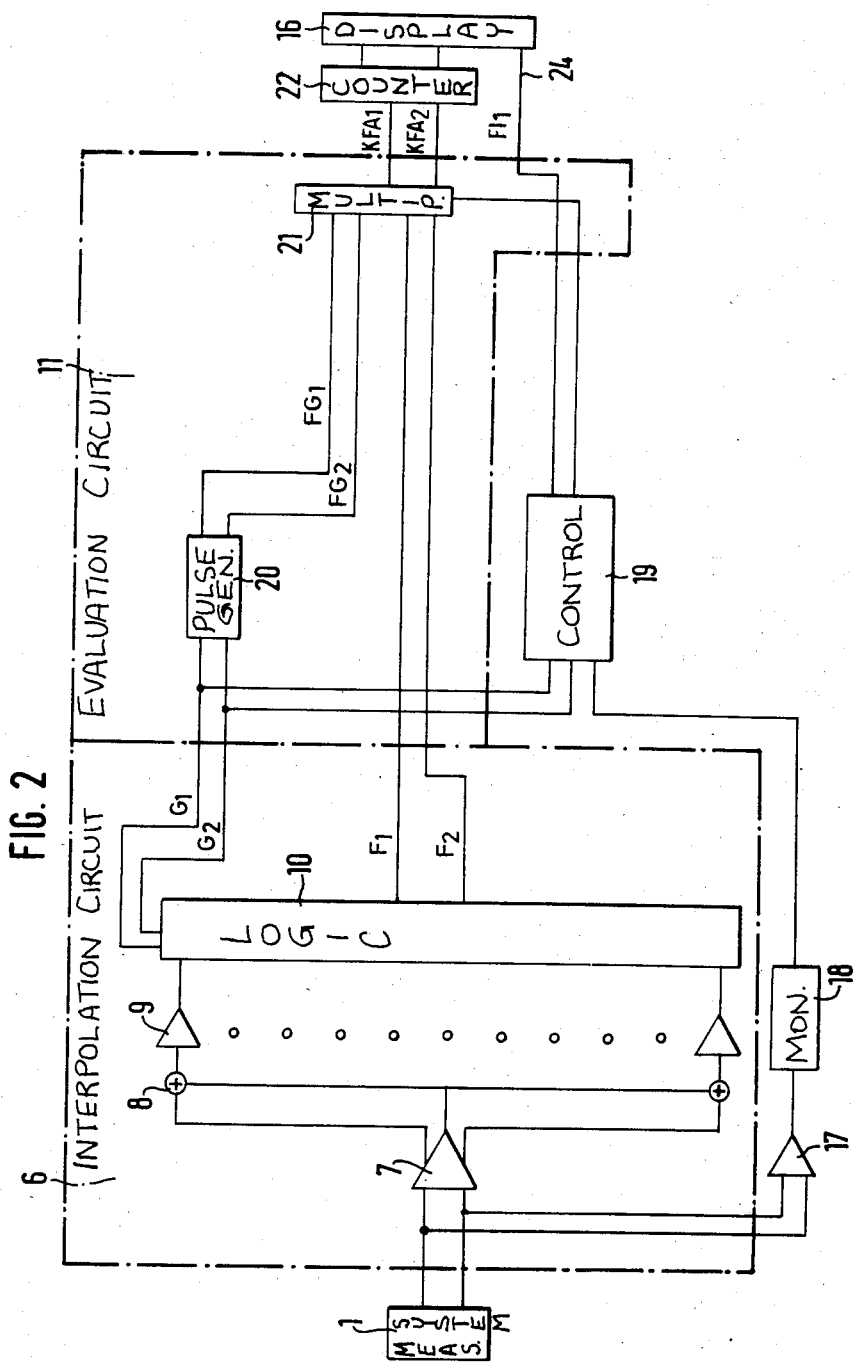
FIG. 2 is a block diagram which shows another embodiment of the invention.

In the embodiment according to FIG. 2, where the same members are used to designate the same or similar parts, the evaluating circuit 11 has a generator 20, which is triggered by the low-resolution rectangular pulses G1 and G2. With each switching edge of the low-resolution rectangular pulses G1 and G2 the generator delivers in correct correlation a constant number of rectangular pulses FG1 and FG2 offset by 90°. These are sent to a multiplexer 21, to which are applied also the high-resolution rectangular pulse sequences F1 and F2. Connected after the multiplexer 21 is a counter 22, which is connected to a display unit 16. The low-resolution rectangular pulses G1 and G2 are connected to the control logic circuit 19.

The mode of operation of the FIG. 2 device is as follows: At high speed of travel, (as determined by monitor 18) the forwarding of the high-resolution rectangular pulse sequence F1 and F2 is blocked at the multiplexer 21 by the control logic circuit 19. At low speeds of travel, the multiplexer 21 is switched synchronously with the low-resolution rectangular pulses G1, G2, so that the low-resolution rectangular pulses G1, G2 are forwarded to counter 22. Via line 24 an indication is provided on whether rectangular pulses interpolated from the measuring system 1 or rectangular pulses generated by generated 20 are present.

The advantage of the circuit according to FIG. 1 resides in the simple construction with standard components, while the special advantage of the circuit according to FIG. 2 is that it can be connected to different counting register cards.

While specific embodiments of the invention has been shown and described in detail to illustrate the application of the principles of the invention, it will be understood that the invention may be embodied otherwise without departing from such principles.

What is claimed is:

1. A device for measuring the length of a movement comprising:
    measuring means for generating two mutually offset sinusoidal voltage signals which depend on the movement whose length is to be measured;
    interpolation means connected to said measuring means for receiving said voltage signals and for generating therefrom two high resolution rectangular pulse sequences which are offset from each other by 90° and which correspond to an interpolation between said two voltage signals, said interpolation means also generating two low resolution rectangular pulse sequences which are offset with respect to each other by 90° and which correspond to the two voltage signals;
    evaluation means connected to said interpolation means for receiving said high and low-resolution pulse sequences and for evaluating a length measurement based on at least one of said pulse sequences;
    monitor means connected to said measuring means for receiving said voltage signals and for generating a speed related signal which corresponds to a speed of the movement to be measured; and
    control logic means connected to said monitor means for receiving said speed related signal and being connected to said evaluation means for blocking the use of said high resolution pulse sequences when said speed related signal indicates a speed above a selected value, and for including said high resolution pulse sequences and said low resolution pulse sequences for evaluation of the length when said speed relates signal indicates a speed below said value.

2. A device according to claim 1, wherein said evaluation means comprises a pair of direction discriminators each connected to said interpolation means for receiving one of said high and low-resolution pulse sequences, a counter connected to each direction discriminator for counting out pulses of said high and low-pulse sequences, and a display connected to said counters for displaying a number of pulses counted of said high and low-resolution pulse sequences, said control means connected to said counter for said high-resolution rectangular pulse sequence and being connected to said high and low-resolution direction discriminators for resetting said high-resolution counter to a count of zero at the beginning of each low-resolution pulse and for disabling a transmission of a counted signal from said high-resolution counter to said display when said speed related signal indicates a speed above said selected value.

3. A device according to claim 1, wherein said evaluation means comprises a pulse generator connected to said interpolator circuit for receiving said low-resolution pulse sequences, a multiplexer connected to said pulse generator and to said interpolation circuit for receiving said high-resolution pulse sequences, and a counter connected to said multiplexer for counting out high and low resolution rectangular pulses, said control means connected to an input of said pulse generator for receiving said low-resolution pulse sequences, and being connected to said multiplexer for causing said multiplexer to transmit signals which only depend on said low resolution pulse sequences when said speed related signal indicates a speed above the selected amount.

4. A method of measuring the length of a movement comprising:

generating two mutually offset sinusoidal voltage signals which depend on the movement whose length is to be measured;

generating two low-resolution rectangular pulse sequences which are offset by 90° with respect to each other and which correspond to the two sinusoidal voltage signals;

generating two high-resolution rectangular pulse sequences which are offset by 90° with respect to each other and which correspond to an interpolation of the two sinusoidal voltage signals;

generating a speed related signal which corresponds to a speed of the movement whose length is to be measured and based on the sinusoidal voltage signals;

generating a display value based on an evaluation of at least one of the high and low rectangular pulse sequences; and controlling the display values so that it is based only on the low-resolution pulse sequences when the speed relted signal indicates a speed above a selected amount and so that the display value is based both on the high and low-resolution pulse sequences when the speed related signal corresponds to a speed below the selected amount.

* * * * *